(No Model.)
C. S. BEEBE.
VEHICLE RUNNING GEAR.
No. 482,154. Patented Sept. 6, 1892.
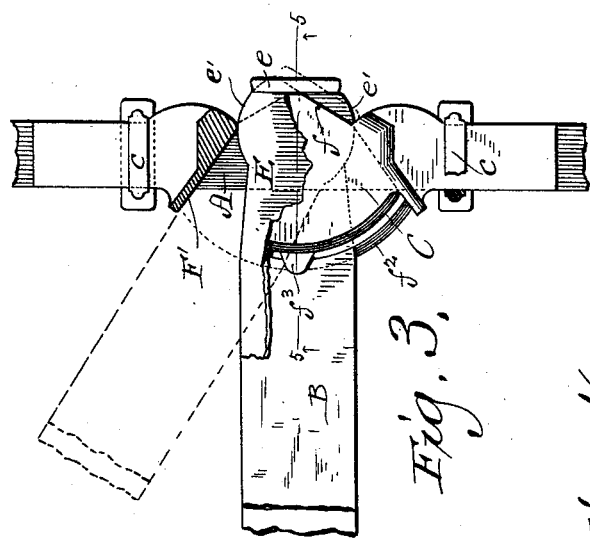
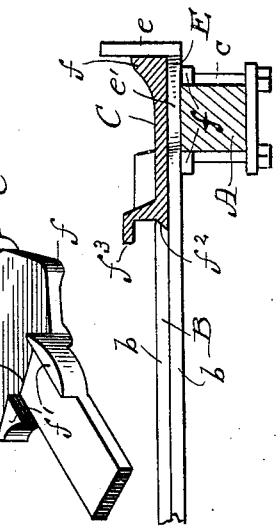
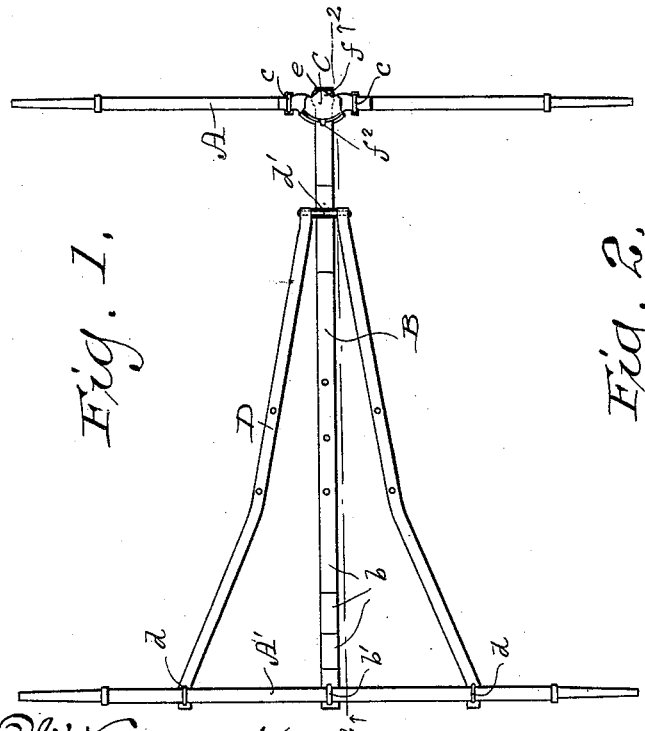
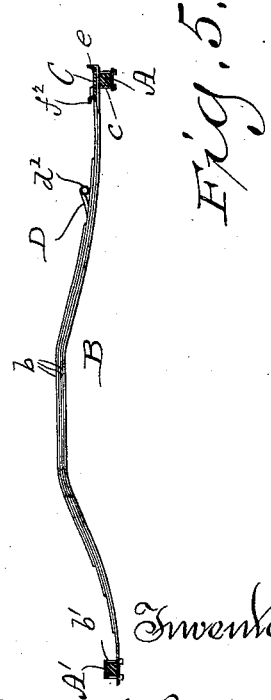

UNITED STATES PATENT OFFICE.

CHARLES S. BEEBE, OF RACINE, WISCONSIN.

VEHICLE RUNNING-GEAR.

SPECIFICATION forming part of Letters Patent No. 482,154, dated September 6, 1892.

Application filed March 28, 1892. Serial No. 426,706. (No model.)

*To all whom it may concern:*

Be it known that I, CHARLES S. BEEBE, a citizen of the United States, and a resident of Racine, in the county of Racine, and in the State of Wisconsin, have invented certain new and useful Improvements in Vehicle Running-Gears; and I do hereby declare that the following is a full, clear, and exact description thereof.

My invention relates to new and useful improvements in the construction of vehicle running-gears; and it consists in the matters hereinafter described, and pointed out in the appended claims.

In the accompanying drawings, illustrating my invention, Figure 1 is a top plan view of a vehicle running-gear constructed in accordance with my invention. Fig. 2 is a longitudinal sectional view of the same, taken on line 2 2 of Fig. 1. Fig. 3 is an enlarged plan view of a portion of the device, showing parts broken away to better illustrate details of construction. Fig. 4 is a detail perspective view of one of the parts, showing the same in an inverted position. Fig. 5 is a central vertical sectional view taken on line 5 5 of Fig. 3.

In said drawings, A A' respectively represent the front and rear axles of the running-gear, and B a spring-reach connecting said front and rear axles, said spring-reach being preferably composed of two or more leaves $b$ $b$, arranged one upon another, as shown in Fig. 2. The rear end of the spring-reach B is secured to the rear axle A' by means of a suitable clip $b'$, and the forward end of the reach is movably engaged with the front axle A by means of a suitable fifth-wheel connection C, which will be presently described in detail. Side springs D D are arranged upon opposite sides of the spring-reach, each of said springs being connected at its rear end with the rear axle A' by a suitable clip $d$, said rear ends of said springs D D being engaged with the rear axle at considerable distances from the connection between said axle and the reach B. The side springs D D are arranged with their forward ends converging and connected together by means of a transverse bolt $d'$, arranged so as to rest in movable engagement with the upper front portion of the spring-reach B. By this construction a more elastic structure is provided than if the ends of the side springs were rigidly connected with the reach. The central portions of said spring-reach B and of the side springs D D are bent upwardly above the level of the axles A and A', the said central portions of said reach and said springs being arranged in the same horizontal plane and adapted to afford a support for the body of the vehicle. The fifth-wheel connection between the forward end of the spring-reach B and the front axle A comprises a plate C, arranged to rest upon the upper side of said axle A and secured thereto by means of clips $c$ $c$, arranged to embrace the axle and the ends of the plate C, as shown in the drawings. The lower surface of this plate C is provided with a depression or recess F, of a depth corresponding to the thickness of the lower leaf of the spring constituting the reach B, so that when said plate rests upon the top of the axle a space wider at the rear than at the front and of a depth sufficient for the reception of the end of said leaf is left. The forward part E of said leaf is provided with an upturned end $e$, which is arranged to abut against an angular projection $f$ on the front edge of the plate C, the sides of said front portion E being curved, as at $e'$ $e'$, so as to fit snugly between the forward ends of the shoulders or side walls F' F' of the recess or depression F, while permitting an oscillating movement of said spring with respect to the plate C. The plate C is provided with downwardly-projecting lugs $f'$ $f'$ at its front and rear edges, adapted to embrace the front axle A, and the rear edge of said plate C is made in the form of an arc struck from the apex of the angular projection $f$ as a center, said rear edge being preferably beveled, as shown at $f$, and the front end of the second leaf $b$ of the spring-reach B is correspondingly beveled and arranged to engage with the beveled edge $f^2$ of said plate. A projection $f^3$ is provided upon the upper rear portion of the plate C and is arranged to extend over the end of said leaf and to prevent the same from being lifted above the plate C.

By my improved construction of springs and the spring-reach an exceedingly elastic as well as strong support is afforded for the body of the vehicle, while by my improved fifth-wheel connection between said spring-reach and the front axle a very strong connection is afforded without necessitating the use of a king-bolt or the making of any holes through the axle or the plate C, and longitudinal movement of the reach with respect to the front axle is prevented by the engagement of the upturned end $e$ of the lower leaf of the spring with the front part of said plate and of the end of the second leaf with the arc $f^2$ at the rear edge of said plate.

By my improved construction of the fifth-wheel connection, while perfect freedom of the parts to oscillate to enable the vehicle to be turned from side to side is insured, yet the parts are held very securely together and prevented from rattling.

My improved running-gear is at once exceedingly simple in construction, cheap to manufacture, and durable.

Having now fully described my invention, what I claim as new, and desire to secure by Letters Patent of the United States, is—

1. In a running-gear, the combination, with the front and rear axles, of a spring-reach connecting said axles and having a flexible connection with the front one of said axles and side springs engaged with the rear axle upon opposite sides of the reach and connected together at their front ends by a transverse rod or bolt arranged to movably engage with the forward part of said spring-reach, substantially as set forth.

2. In a running-gear, the combination, with the front and rear axles, of a spring-reach engaged at its rear end with the rear axle and having a flexible connection at its front end with the front axle, and side springs engaged with the rear axle upon opposite sides of the reach, said springs being arranged to converge toward their forward ends, and a transverse rod or bolt connecting the forward ends of said side springs and arranged to rest in movable engagement with the upper surface of the forward portion of said spring-reach, substantially as set forth.

3. In a vehicle running-gear, the combination, with the front and rear axles, of a spring-reach comprising two or more leaves arranged one upon another, said spring-reach being connected rigidly with the rear axle and flexibly with the front axle, side springs each comprising one or more leaves and connected with the rear axle upon opposite sides of the reach and converging toward their front ends, and a transverse connection between said front ends adapted to rest in movable engagement with the forward part of said spring-reach, said spring-reach and said side springs being bent upwardly toward their central portions, so as to afford a support for the body of the vehicle above the body of the axles, substantially as set forth.

4. In a vehicle running-gear, the combination, with the front and rear axles, of a spring-reach composed of two or more leaves and rigidly connected at its rear end with the rear axle and flexibly connected at its forward end with the front axle, side springs engaged with said rear axle upon opposite sides of the reach and converging toward their forward ends, and a transverse rod or bolt connecting the forward ends of said springs and adapted to be arranged to rest in movable engagement with the upper surface of the forward part of the reach, substantially as set forth.

5. In a vehicle running-gear, the combination, with the front and rear axles, of a reach connecting the same and provided with a flat extension, a plate secured to the front axle and provided with a recess or depression adapted for the reception of said extension of the reach, and stops upon said extension adapted to engage with the front and rear sides of said plate, substantially as set forth.

6. In a vehicle running-gear, the combination, with the front and rear axles, of a reach connecting the same and provided at its forward end with a flat extension, a plate adapted to be secured upon the top of the front axle and provided with a recess for the reception of said extension of the reach, an angular projection on the forward side of said plate, an extension on the rear side of said plate constructed in the form of an arc of a circle, an upturned end on the said extension of the reach adapted for engagement with said angular projection, and a stop on said reach adapted for engagement with the extension on the rear of said plate, substantially as set forth.

7. In a vehicle running-gear, the combination, with the front and rear axles, of a spring-reach comprising two or more flat leaves, an extension on the front end of the lower leaf, a plate adapted for engagement upon the top of the front axle and provided with a recess for the reception of said extension and provided with an angular projection on its front side and with a projection on its rear side constructed in the form of an arc of a circle, and an upturned ear or stop on the front end of the extension of said lower leaf adapted for engagement with the angular projection on the front of said plate, and the second leaf of the reach being arranged to engage with said rearward projection on said plate, substantially as set forth.

In testimony that I claim the foregoing I have hereunto set my hand, at Racine, in the county of Racine and State of Wisconsin, in the presence of two witnesses.

CHARLES S. BEEBE.

Witnesses:
ALBERT L. ANDERSON,
LEWIS N. PECK.